United States Patent [19]

Baril et al.

[11] Patent Number: 4,826,347
[45] Date of Patent: May 2, 1989

[54] FORCE-FITTED CONNECTION OF A CIRCULAR METAL TUBE IN AN OVAL HOUSING

[75] Inventors: Jacques Baril, La Murette; Angel Re, Voiron; Gérard Vannier, Clerval; Yves Saugier, Anglure, all of France

[73] Assignee: Cegedur Societe de Transformation de L'Aluminium Pechiney, Paris, France

[21] Appl. No.: 112,272

[22] Filed: Oct. 26, 1987

[30] Foreign Application Priority Data

Nov. 3, 1986 [FR] France ............... 86 15442

[51] Int. Cl.$^4$ .............................................. B25G 3/28
[52] U.S. Cl. .................... 403/282; 403/334; 403/383; 403/284
[58] Field of Search ............. 403/383, 334, 284, 282; 285/176, 382, 399; 29/520, 525

[56] References Cited

U.S. PATENT DOCUMENTS 1,765,651  6/1930  Bryant ..................... 29/525 UX
1,950,947  3/1934  Mulroyan ................... 285/176
4,029,426  6/1977  Sims, Jr. .................. 29/525 X

FOREIGN PATENT DOCUMENTS 143062   5/1985  European Pat. Off. .
2553690  9/1986  France .
1254865  11/1971  United Kingdom ............ 403/383

Primary Examiner—Andrew V. Kundrat
Attorney, Agent, or Firm—Oblon, Fisher, Spivak, McClelland & Maier

[57] ABSTRACT

A connection between a circular cylindrical tube and a plate or sleeve includes a housing extending along an axis from an inlet opening in a surface of the plate or sleeve and a circular cylindrical tube having an end fittable in the housing. The housing includes a first cylindrical truncated cone extending to the inlet opening and having a vertex angle $\beta$ with respect to the axis of between 5° and 20°, and a second oval truncated cone coaxial with the first cone and connected thereto. The second cone has generatrices forming an angle $\alpha$ of between 0.5° and 5° with respect to the axis.

5 Claims, 1 Drawing Sheet

FORCE-FITTED CONNECTION OF A CIRCULAR METAL TUBE IN AN OVAL HOUSING

BACKGROUND OF THE INVENTION

1. Field of the Invention

The invention relates to a connection obtained by force-fitting a circular cylindrical metal tube in a housing of oval cross-section, this housing either being the internal cavity of a sleeve or an opening in a thick plate.

2. Background of the Related Art

A similar type of connection between a circular cylindrical tube and a housing of circular section is known from French Patent Application FR-A-2 553 690. This patent application describes and claims a method of connecting a circular tube in a sleeve provided with a housing of circular cross-section and having at its inlet a double circular bevel. To ensure that the connection has high resistance to axial torsion, the bore of the sleeve has one (or more) longitudinal grooves. However, the production of these grooves or channels represents an additional machining operation which is often awkward and, in particular, expensive.

SUMMARY OF THE INVENTION

It is therefor the object of this invention to provide a connection having a resistance to torsion equivalent to that of the above-noted French Patent Application while omitting the grooves.

The object is achieved according to the invention by producing a connection between a circular cylindrical tube and a housing in an element, such as a plate or sleeve. The connection comprises a housing in the element, the housing extending along an axis from an inlet opening in a surface of the element and comprising a first cylindrical truncated cone extending to the opening and having a vertex angle $\beta$ respect to the axis of between 5° and 20° and a second oval truncated cone coaxial with the first cone and connected thereto. The second cone has generatirces forming an angle $\alpha$ of between 0.5° and 5° with respect to the axis. A circular cylindrical tube has an end fittable into the housing.

It is preferable if the sleeve or the plate are obtained by casting which allows oval housings to be produced economically directly to the final dimensions without machining and with a surface quality which is favorable to the high mechanical strength of the connection. Chilled casting seems to be particularly suitable.

To ensure adequate gripping, it is preferable for the circumference of the oval cone at the end of the tube, once installed, to be less than the initial circumference of the cylindrical tube or than the small circumference of the optional truncated cone of the external surface of the tube.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

Figure 3:
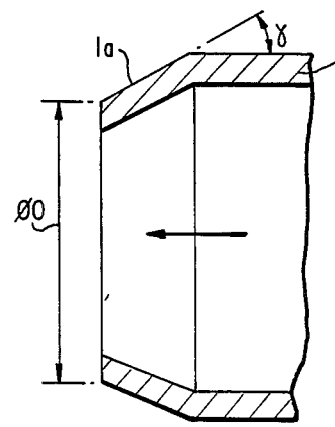
FIG. 3 shows an axial section of the end of the tube before fitting in the housing.

The preferred embodiment of FIG. 3 shows a circular tube 1 of external diameter $\phi_e$, having an internal diameter $\phi_1$ and having at its one end a truncated cone-shaped surface 1a of vertical angle $\gamma$ and of which the minimum external diameter is $\phi_0$.

Figure 1:
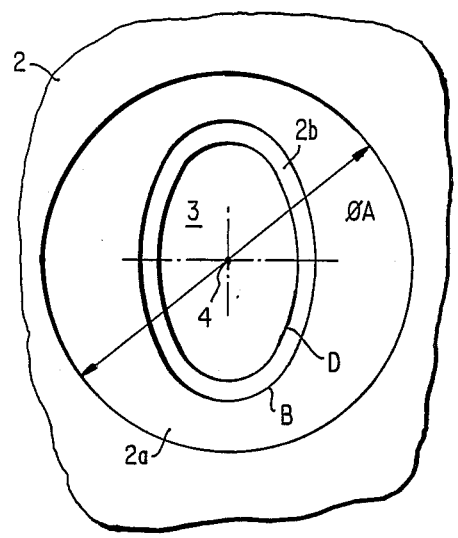
FIG. 1 shows an end view of a housing according to the invention as formed in a partially shown cast plate.
Figure 2:
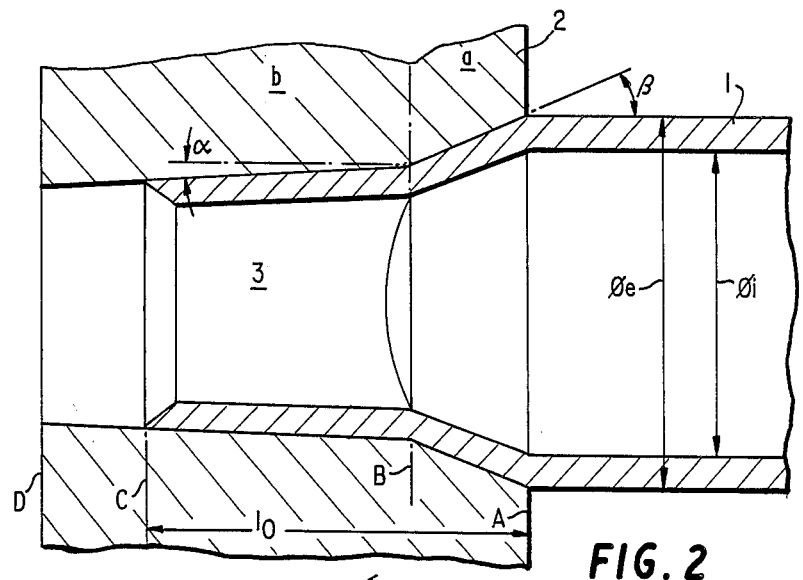
FIG. 2 shows an axial section along the major axis of the ellipse of the tube-plate connection produced according to the invention.

As seen in FIGS. 1 and 2, this tube is connected to a plate 2 having a housing 3 extending from an inlet opening thereof and formed as a first circular truncated cone 2a (in the region a) of which vertex angle is $\beta$ and of which the opening diameter is $\phi_A$. Cone 2a is connected to a second truncated oval cone 2b (in the region b) of which the directrix is an oval B and of which the generatrices B-D form an angle $\alpha$ with the central housing axis 4. The circumference of the oval cone 2b at a position to which the end of the installed tube 1 extends is preferably less than $(\pi.\phi_0)$, or $(\pi.\phi_e)$ if the tube is not bevelled.

Angle $\gamma$ is equal to or greater than angle $\beta$. Diameter $\phi_0$ is less than diameter $\phi_A$.

EXAMPLE 1

Fittings such as those shown in FIGS. 1, 2 and 3 were produced from:

1. A circular tube of external diameter $\phi_o = 28.2$ mm, having a thickness of 1.6 mm and an end bevel $\phi_o = 23.4$ mm with an angle $\gamma = 11°$, the tube being composed of Al alloy 5086 in state H16 according to the Aluminum Association designations.

2. Sleeves composed of Al alloy A-S 7 G.0.6, chill molded in state Y33 and having four housings of differing geometry and surface state (Table 1). In all cases, the inlet bevel 2a was machined by precision turning to an opening $\phi_A = 28.6$ mm, an angle $\beta = 11°$ and an axial length A-B of about 6 mm. The oval cone portion 2b of each of the four housings had the following characteristics:

TABLE 1

| Housing Number | Geometry | State | Dimensions at 20 mm from the inlet and (A) (mm) | $\alpha$ (degrees) |
|---|---|---|---|---|
| 1 | Elliptical Cone | As cast | Axes: major = 23.4 mm minor = 22.9 mm | 1 |
| 2 | Circular Cone | As cast | diameter = 23.15 mm | 1 |
| 3 | Circular Cone | Precision machined | diameter = 23.15 mm | 1 |
| 4 | Circular Cylinder | Precision machined | diameter = 23.15 mm | 0 |

The axial length of fitting was lo = 35 mm in all cases.

The average and the standard deviation ($\sigma$) in the axial fitting force, the axial wrenching force and axial torsion stress were measured on the connections thus produced, with five fittings in each of the above cases.

The results are compiled in the Table II below. It can be seen that the oval geometry provides an appreciable gain in torsional resistance over the circular geometry, whereas the as-cast surface state increases the axial extraction force over the precision machined state.

Finally, not only does the conical geometry increases the fitting force, it also contributes a substantial gain in axial extraction force relative to the cylindrical geometry.

Obviously, numerous modifications and variations of the present invention are possible in light of the above teachings. It is therefore to be understood that within the scope of the appended claims, the invention may be practiced otherwise than as specifically described herein.

TABLE II

| Designation of type of connection | Definition of housing | Connecting force in Newtons | | Extraction face E in Newtons | | Torsional moment C in Newton-meters | |
|---|---|---|---|---|---|---|---|
| | | $\overline{A}$ | $\sigma_A$ | $\overline{E}$ | $\sigma_E$ | $\overline{C}$ | $\sigma_C$ |
| 1 | Oval conical as cast | 24 800 | 1 050 | 19 050 | 1 300 | $\geq 320^{(a)}$ | — |
| 2 | Round conical as cast | 25 050 | 1 060 | 19 100 | 1 300 | 230 | 27 |
| 3 | Round conical machined | 24 450 | 5 350 | 14 700 | 2 550 | 180 | 55 |
| 4 | Round cylindrical machined | 20 050 | 5 320 | 10 550 | 650 | 165 | 52 |

| | | Influence on the characteristics | | | | | |
|---|---|---|---|---|---|---|---|
| Connections compared | Parameters | Connecting force A | | Extraction force E | | Torsional moment C | |
| | | $\overline{A}$ | $\sigma_A$ | $\overline{E}$ | $\sigma_E$ | $\overline{C}$ | $\sigma_C$ |
| 1 compared to 2 | Oval/round | ≃ | ≃ | ≃ | ≃ | >40% | — |
| 2 compared to 3 | Crude/machined | ≃ | × 1/5 | +30% | × ½ | +30% | × ½ |
| 3 compared to 4 | Conical/cylindrical | +20% | ≃ | +40% | ≃ | +10% | ≃ |

$(a)$ deformation of the tube, connection intact

What is claimed as new and desired to be secured by letters patent of the United States is:

1. A connection between a circular cylindrical tube and an element having a housing, comprising:
   an element defining a housing extending along an axis from an inlet opening in a surface of said element, said housing comprising:
   (a) a first cylindrical truncated conical bore in said housing and extending to said opening and having a vertex angle with respect to said axis of between 5° and 20°; and
   (b) a second oval truncated conical bore in said housing and coaxial with said first conical bore and contiguous therewith, said second conical bore having generatrices forming an angle of between 0° and 5° with respect to said axis; and
   a circular cylindrical tube having an end fitted in said housing.

2. The connection of claim 1, wherein said tube, prior to fitting in said housing, has at said end a circular truncated conical external surface whose vertex angle $\gamma \geq \beta$, wherein a minimum diameter $\phi_o$ of said external surface is smaller than a diameter $\phi_A$ of said inlet opening.

3. The connection of claim 1, wherein walls of said housing at said second conical bore are unmachined.

4. The connection of claim 2, wherein walls of said housing at said second conical bore are unmachined.

5. The connection of claim 2, wherein said tube is fitted in said housing and a diameter of said second conical bore at a position corresponding to said end of said tube is less than $\pi \cdot \mu_o$.

* * * * *

UNITED STATES PATENT AND TRADEMARK OFFICE
CERTIFICATE OF CORRECTION

PATENT NO. : 4,826,347
DATED : May 2, 1989
INVENTOR(S) : JACQUES BARIL ET AL.

It is certified that error appears in the above-identified patent and that said Letters Patent is hereby corrected as shown below:

In column 2, line 11, delete "$\emptyset_1$" and insert --$\emptyset_i$--;

In Table II, heading, delete "Extraction face" and insert --Extraction force--;

In column 4, line 39, delete "$\pi \cdot \mu_o$" and insert --$\pi \emptyset_o$"--.

Signed and Sealed this

Twenty-second Day of May, 1990

*Attest:*

HARRY F. MANBECK, JR.

*Attesting Officer*  *Commissioner of Patents and Trademarks*